Aug. 22, 1961  M. UMANOFF  2,997,311
SHOPPING CART WITH COLLAPSIBLE SEAT
Filed May 26, 1960
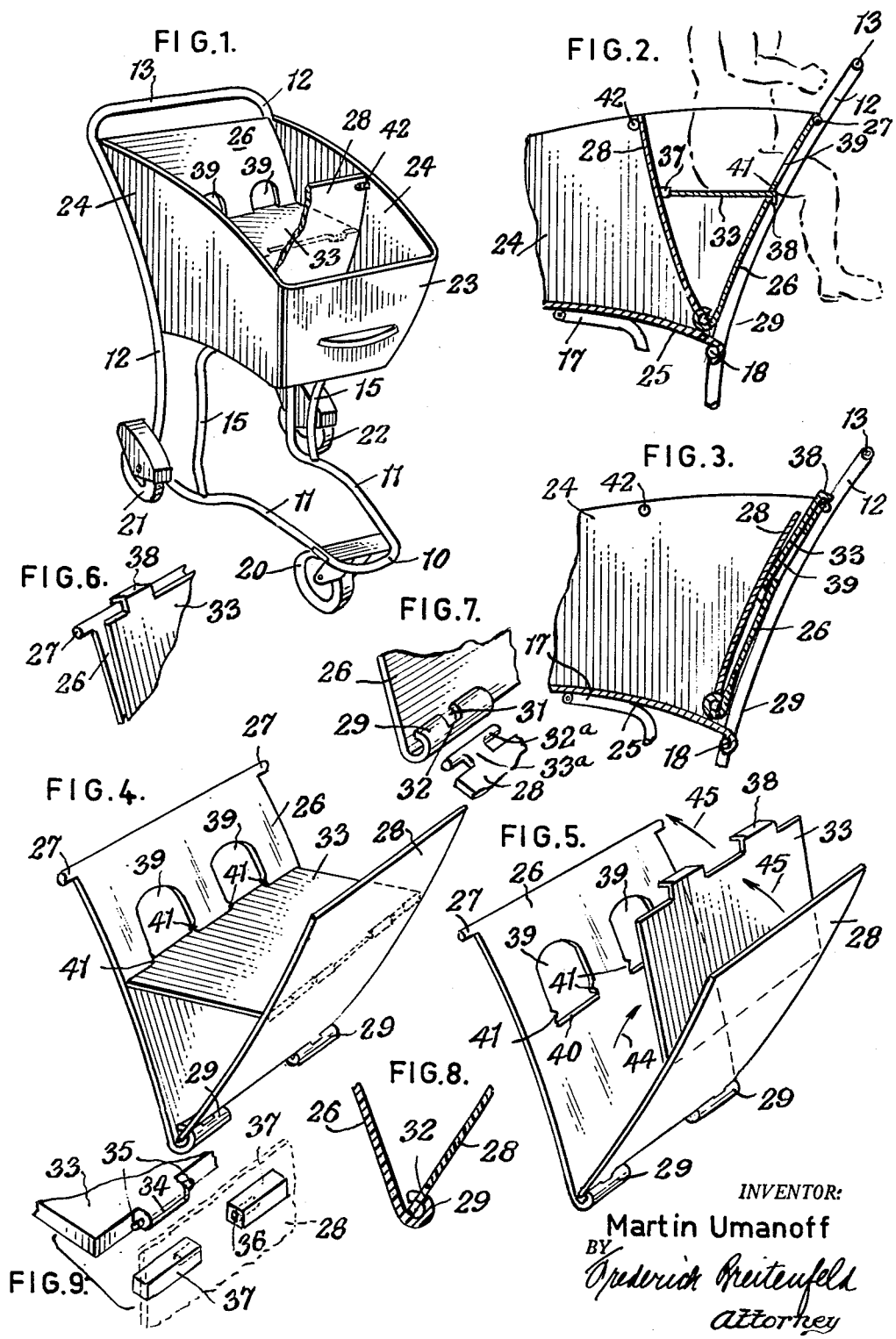
INVENTOR:
Martin Umanoff
BY
Frederick Breitenfeld
Attorney

United States Patent Office 2,997,311
Patented Aug. 22, 1961

2,997,311
SHOPPING CART WITH COLLAPSIBLE SEAT
Martin Umanoff, Huntington, N.Y., assignor, by mesne assignments, to R. A. MacPlum Industries, Inc., a corporation of New Jersey
Filed May 26, 1960, Ser. No. 31,866
5 Claims. (Cl. 280—33.99)

This invention relates to shopping carts of the type currently in common use in supermarkets, having a wheeled undercarriage and a bin mounted thereon and adapted to accommodate merchandise.

It is a general object of the invention to provide a cart of improved construction, embodying features which render the cart more versatile and in particular provide for the seating of a child within the cart while the latter is wheeled about the store.

It is an additional object of the invention to provide a support or seat structure in a shopping cart on which a child may be seated safely and comfortably and in a position facing the person wheeling the cart. It is a further object of the invention to provide a seat or shelf which, when not functioning as a seat, will be collapsible so as not to take up space within the bin of the cart, and which can when required be quickly and easily shifted into operative position.

It is a particular objective to provide a staunch effective seat in a cart in which the bin is composed of plastic or equivalent material as distinguished from metallic wire, and to construct and hingedly mount the seat in an efficient inexpensive manner which is entirely practical from a manufacturing standpoint.

Another object is to provide an adjustable seat in association wtih a bin wall which is itself in pivotal engagement with the cart so that successive bins may be nested in telescopic fashion.

More particularly, the invention contemplates the provision of a hinged rear wall on the merchandise bin of the cart, a panel extending across the inside of the bin and having its lower edge pivotally connected to the lower edge of the rear wall, and a shelf or seat pivoted at one end to the panel at a point intermediate the ends of the latter and having hook-shaped elements at its other end for cooperaiton with enlarged leg holes provided in the rear wall. When the seat is operatively positioned, the rear wall and panel are arranged at an angle with respect to each other, the apex of the angle pointing downwardly, and the seat is arranged horizontally with its hook elements engaging the leg holes in the rear wall of the bin. When the seat is not being used, the panel is folded against the rear wall and the seat extends upwardly between the panel and rear wall so that the hook-shaped elements can engage the upper edge of the rear wall and maintain the parts in folded condition.

One way of achieving these objects and advantages, and such other objects and benefits as may hereinafter appear or be pointed out, is illustrated in the accompanying drawing, in which:

FIG. 1 is a perspective view of a shopping cart provided with the improvements of the present invention, the improvements being fragmentarily shown;

FIG. 2 is a vertical sectional view of the rear portion of the bin of a cart showing the improved seat construction in its operative position;

FIG. 3 is a view similar to FIG. 2, showing the seat in its flattened or collapsed position;

FIG. 4 is a perspective view of the seat construction, detached from the cart, in its operative position;

FIG. 5 is a view similar to FIG. 4 showing the parts in a partly open position;

FIG. 6 is a detail view showing the hook-shaped elements on the seat engaging the upper edge of the rear wall of the cart;

FIG. 7 is a detail view of one type of hinge connection between the lower end of the rear wall and the lower end of the panel;

FIG. 8 is a sectional view through the hinge connection shown in FIG. 7; and

FIG. 9 is a detail view showing the elements of the hinge which connects the seat to the face of the panel.

In the type of shopping cart shown in FIG. 1 of the drawing, the under-carriage is composed essentially of three, preferably metallic, tubular elements or rods. The main element is deformed to define a V-shaped base positioned near the floor, the apex 10 of the base being toward the front of the cart and the arms 11 diverging rearwardly. At their rear ends the arms 11 are bent upwardly to define rear posts 12 which are connected together at the top in a transverse section 13 constituting the handle of the cart. The second element of the under-carriage consists of a similar tubular rod bent to form a bin supporting frame 17 spaced above the base of the under-carriage, and the downwardly projecting supporting posts 15 fastened at their lower ends to the arms 11.

The third element of the under-carriage consists of a transverse rung 18 (FIGS. 2 and 3) extending between and rigidly secured at its ends to the posts 17.

The under-carriage is supported by the three wheels shown respectively at 20, 21 and 22, the wheel 20 being mounted in caster-like fashion. The bin is preferably composed of molded non-metallic material such as a suitable plastic, and it includes a front wall 23, side walls 24 and a bottom wall 25. The central region of the bottom wall rests upon the bin support 17 and is secured thereto by appropriate fastening means, not shown. It is to be observed that the bottom wall 25 is slightly convex upwardly and slopes downwardly toward its rear edge where it is supported by the rung 18. The front wall 23 slants forwardly and upwardly and the top edges of the side walls 24 rise slightly toward the rear, so that the bin as a whole has a relatively narrow nose and a depth and width that increase gradually in a rearward direction. The construction of the bin and the under-carriage therefor, as above described, facilitates the nesting in tandem relationship of the cart with other similar carts.

In order to make nesting of the carts possible, the rear wall 26 of the bin may be made as a separate pivotal element and it is suitably shaped to normally close the rear end of the bin. At its upper end it is provided with laterally-projecting hinge pins 27 (FIG. 6), which may be integral with the rear wall and which fit into suitable apertures or recesses in the rear posts 12, thereby pivotally supporting the rear wall with respect to the bin so that the wall is in the form of a hinged gate. At its lower end, the rear wall or gate 26 is pivotally connected to the lower end of a panel 28, which may also be of plastic material, and which is slightly curved to generally conform to the contour of the rear wall 26. The preferred hinge connection between the lower ends of the gate and panel is shown in FIG. 7 wherein it will be noted that the bottom edge of the rear wall 26 is provided with several arcuate or curled-up elements 29 within each of which is confined one of several T-shaped projections 32a formed on the lower end of the panel 28. The neck portion 33a of each of the T-shaped elements 32a extends through a notch 31 in its associated arcuate element 29 and upon the pivotal movement of the panel 28 into operative position, the neck portion 33a, abuts the bottom edge 32 of the notch, thus limiting the extent of pivotal movement of the panel in a direction away from the rear wall.

Pivotally attached to the inside face of the panel 28, so that it is located between the panel and the rear wall or gate 26, is a seat or shelf 33. The preferred type of pivotal connection between one end of the shelf and the panel is shown in detail in FIG. 9, wherein it will be noted that one edge of the shelf is provided with wings 34, one of which is shown in FIG. 9, the wings being provided at their ends with projections or pins 35 adapted to fit into the recesses 36 provided in a pair of spaced blocks 37 formed on or secured to the face of the panel 28. Preferably, the seat 33, wings 34, and projections 35 are integrally formed out of a plastic material, and the panel 28 and blocks 37 are also integrally formed. Obviously, however, other types of hinges can also be used.

Formed on the edge of the seat 33 opposite the wings 34 are two hook-shaped elements or lugs 38, and provided in the rear wall 26 are two apertures 39 suitably sized to accommodate the legs of a child seated on the shelf 33, as shown in FIG. 2. The apertures 39 are so positioned relative to the hooked lugs 38 that when the shelf is in its operative or supporting position, as shown in FIG. 2, the lugs extend through the apertures and rest upon the lower edges 40 of the latter. In order to hold the lugs 38 firmly in the apertures 39, the opposite sides of the apertures may be provided with detents 41 past which the lugs are forced with a snap action when they are seated on the lower edges 40 of the apertures.

The seat construction is shown in its position of non-use in FIG. 3. It will be noted that the rear wall or gate 26 and the panel 28 are positioned in superposed relation with the shelf 33 extending upwardly between them. This collapsing feature of the device permits the cart to be filled to full capacity when the seat is not in use. When it is desired to use the shelf to support small easily damaged articles which the purchaser does not wish to mingle with other contents of the bin, or to use it as a seat for a child, in the manner shown in FIG. 2, the panel 28 is swung about its lower end toward the left as viewed in FIGS. 2 and 3, until it reaches the position shown in FIG. 2, at which time its further pivotal movement will be halted by the engagement of the necks 33a of the T-shaped elements 32a with the edges 32 of the notches 31 of the hinge that connects the panel 28 with the rear wall or gate 26. In the alternative, if the hinges of the type shown in FIGS. 7 and 8 are not employed, or additionally, abutment pins 42 may be employed to limit the movement of the panel 28 into the cart. As the panel 28 is moved to the position shown in FIG. 2, the shelf 33 may be swung downwardly so that the lugs 38 thereon may enter the apertures 39, and as they do so, a slight downward pressure exerted on the shelf will cause the lugs 38 to be forced past the detents 41 thus locking them in place in the apertures. The device now assumes the position shown in FIGS. 1 and 2 and the shelf forms a sturdy and rigid shelf or seat for a child. Note that the seated child faces to the rear of the cart with his legs extended through the apertures 39.

When it is desired to fold the seat device, the shelf 33 is swung upwardly, as indicated by the arrow 44 in FIG. 5, bringing the lugs 38 out of the aperture 39 and bringing the shelf flatly against the face of the panel. The panel and the shelf are then swung rearwardly on the hinge which connects the panel and the rear wall, as shown by the arrows 45 in FIG. 5, until the parts assume the position shown in FIG. 3. In that position the interior of the bin may be completely filled with merchandise and the rear wall 26 and the panel 28 and shelf 33 lying against it can be swung upwardly about the pivot 27 of the rear wall so that the cart may be arranged in nesting relationship with other carts. When the parts are in the collapsed position shown in FIG. 3, the hooked lugs 38 will springily engage the upper edge of the rear wall or gate 26, thus holding the parts in the collapsed condition and preventing accidental unfolding of the parts.

In many respects it will be understood that the details herein described and illustrated may be altered by those skilled in the art, without necessarily departing from the spirit and scope of the invention as expressed in the appended claims.

What is claimed is:

1. A shopping cart having a bin, said bin including a rear wall in the form of a pivoted gate, the gate being pivoted at its upper end for pivotal movement between the side walls of the bin, a panel located within the bin, the panel being pivotally connected at its lower end to the lower end of the gate, the pivotal connection between the gate and panel permitting the panel and gate to assume an angular relationship, stop means on said bin in the path of the pivotal movement of the panel in a direction away from the gate for limiting said movement of the panel, a shelf located between the panel and gate, one end of the shelf being pivotally connected to the panel, the opposite end of the shelf being provided with hooked lugs, the gate having a pair of openings through which the legs of a child can be extended when the child is seated on the shelf, the hooked lugs fitting through said openings and engaging the lower edge portions thereof when the shelf is disposed horizontally between the panel and gate.

2. A shopping cart according to claim 1 including hinge means for effecting the pivotal connection between the panel and gate, said stop means forming part of said hinge means and serving to prevent said hinge means from pivoting through more than a predetermined angle.

3. A shopping cart according to claim 1 wherein said stop means consists of an abutment projecting from one of the side walls of said bin into the bin.

4. In a shopping cart, a bin having a rear wall, a panel pivotally attached to the lower end of said wall, a shelf having one end pivotally attached to a face of the panel and with its opposite end extended toward the rear wall, and interengaging elements on the shelf and rear wall to support the shelf in a horizontal position between the panel and wall, the interengaging elements on the shelf and rear wall consisting of leg apertures in the rear wall and lugs on the end of the shelf fitting into said apertures when the shelf is arranged horizontally, and the pivotal connection of the shelf to the panel and the pivotal connection of the panel to the rear wall permitting the shelf, the rear wall, and the panel to be folded into superposed relation, the lugs on the shelf fitting over the top edge of the rear wall when the rear wall, shelf and panel are in folded condition.

5. In a shopping cart, the parts provided for in claim 4, wherein the apertures in the rear wall have lower edges on which the lugs rest, and the parts of the rear wall defining the sides of the apertures have detents past which the lugs are moved so that they may be seated on the lower edges of the apertures.

References Cited in the file of this patent

UNITED STATES PATENTS

| | | |
|---|---|---|
| 508,726 | Lange | Nov. 14, 1893 |
| 2,662,775 | Goldman | Dec. 15, 1953 |
| 2,813,725 | Hoedinghaus et al. | Nov. 19, 1957 |
| 2,896,959 | Young et al. | July 28, 1959 |

FOREIGN PATENTS

| | | |
|---|---|---|
| 428,597 | Great Britain | May 15, 1935 |